United States Patent [19]

Euscher et al.

[11] Patent Number: 5,991,613
[45] Date of Patent: *Nov. 23, 1999

[54] METHOD AND ARRANGEMENT FOR ANTENNA SELECTION CONTROL IN A RADIO RECEIVER

[75] Inventors: Christoph Euscher, Rhede; Klaus-Dieter Pillekamp, Erkrath, both of Germany

[73] Assignee: Siemens Aktiengesellschaft, Munich, Germany

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/424,307
[22] PCT Filed: Oct. 12, 1993
[86] PCT No.: PCT/EP93/02807
§ 371 Date: Apr. 26, 1995
§ 102(e) Date: Apr. 26, 1995
[87] PCT Pub. No.: WO94/10764
PCT Pub. Date: May 11, 1994

[30] Foreign Application Priority Data

Oct. 26, 1992 [EP] European Pat. Off. .............. 92118259

[51] Int. Cl.⁶ ..................................................... H04B 1/06
[52] U.S. Cl. .................. 455/277.1; 455/275; 455/562
[58] Field of Search ................................ 455/275, 277.1, 455/277.2, 562, 101

[56] References Cited

U.S. PATENT DOCUMENTS

| | | | |
|---|---|---|---|
| 4,462,099 | 7/1984 | Braun | 371/22 |
| 5,161,252 | 11/1992 | Higuchi et al. | 455/78 |
| 5,239,541 | 8/1993 | Maurai | 370/77 |

FOREIGN PATENT DOCUMENTS

| | | |
|---|---|---|
| 0 213 780 A2 | 11/1987 | European Pat. Off. . |
| 62 047 222 | 2/1987 | Japan . |

OTHER PUBLICATIONS

"On The Radio Link Performance Of The Digital European Cordless Telecommunications (DECT) System", L.B. Lopes, Proceedings of Globecom 90, Dec. 2–5, 1990, pp. 1013–1017.

"Predictive Antenna Selection Diversity (PADS) For TDMA Mobile Radio", Y. Yamao et al, Proceedings of 1991 International Conference On Communications—ICC 91, Jun. 23–26, 1991, pp. 1480–1484.

"A Business Cordless PABX Telephone System On 800 MHz Based On The DECT Technology", C. Buckingham et al, IEEE Communications Magazine, vol. 29, No. 1, Jan. 1991, pp. 105–110.

Primary Examiner—Reinhard J. Eisenzopf
Assistant Examiner—Darnell R. Armstrong
Attorney, Agent, or Firm—Hill & Simpson

[57] ABSTRACT

The method and arrangement is for controlling a radio receiver. The arrangement has a central processor (DECT-C), a device (RSSI-C) for measuring the field strength of received signals, a threshold value generator (TH-C) and two antennas (A1, A2). The central processor (DECT-C) carries out method steps configured in such a way that different procedures (P1, P2) are realized to activate one of a plurality of antennas (A1, A2) of the radio receiver as a function of measured field strength values (RSSI1) of received signals and as a function of overshooting or undershooting of a threshold value (TH0).

32 Claims, 7 Drawing Sheets

METHOD AND ARRANGEMENT FOR ANTENNA SELECTION CONTROL IN A RADIO RECEIVER

BACKGROUND OF THE INVENTION

The invention relates to a method for antenna selection control in a radio receiver and to an arrangement for antenna selection control in a radio receiver.

In the case of radio-frequency telecommunication in the gigahertz region, because of the propagation characteristics the transmission conditions are frequently very different within a small spatial region (centimeter region). The consequence of this is that in the case of moving systems the transmission conditions fluctuate strongly in time even at low speeds of, for example, approximately 1 m/s. In order to be able to achieve transmission which is as good as possible during movement even in regions with poor transmission conditions, a second, spatially offset antenna is installed at the base station, which second antenna, because of the spatial separation, provides other transmission conditions and to which it is possible to switch in this case (antenna diversity). Such an antenna control is provided in essence in the "Digital European Cordless Telecommunications System" (DECT) Standard (draft prETS 300 175-3: 1991, page 183/184). An antenna switch-over is provided in this standard on the basis of the quality of reception in the following cases:

a) result of the A- and X-CRC;
b) conditions of the S- and Z-fields;
c) radio signal strength; and
d) other suitable parameters.

The "burst-mode two-way communications system" has already been disclosed in European Patent Application EP 0 213 780 A2 (Application No.: 86306015.8). By contrast with the arrangement according to the invention, the known system has a plurality of transceiver devices having one threshold value arrangement each, which are connected to a switching element for switching over to one of two antennas. The threshold value arrangements realize a prescribed absolute threshold value (page 3, column 3, lines 55/56). The threshold value is, however, also to be adjustable from outside by means of software, and thus to be optimizable, it remaining open in the published European Patent Application how such an adjustment and optimization would have to be performed (column 3, lines 57/58; column 4, line 41). In particular, it also remains open whether such an optimization is performed by a single adjustment of the threshold value, for example during manufacture or upon commissioning of the apparatus, or is also performed in continuous operation. Obviously, only a single adjustment of the threshold value is provided, since it is stated in the European Patent Application that in practice the threshold value corresponds to that value at which reception is still just adequate ("worst-case service"), generally 15 dB below an average field strength at maximum range (column 4, lines 41–46).

In the known system, signal fades (drops in field strength) are detected by means of a rapid rate of change in the received field strength, this parameter being compared with values averaged over a plurality of time periods (column 4, lines 47–56). However, the averaging, provided for in this case, requires substantial computational outlay and a corresponding computing time. There is no provision in the known system to change the threshold value with rising field strength values.

Specifically, if appropriate systems contain two antennas, but only one receiver, there is the substantial problem for the control of the antenna switch-over that the quality of the signals received at both antennas cannot be measured simultaneously. The measurements have to be carried out one after the other in order to decide at which antenna signals of better quality of reception can be received. In this case, there is the difficulty, on the one hand, that a measurement at one antenna is bound up with the reception of a burst at this antenna, and that the measurement result "poor quality of reception" can lead to a loss of data. On the other hand, a further problem consists in that, depending on the speed of movement of the actual device or of a corresponding device to which there is a radio connection; and on the burst rate, the measurement result is valid only for a few bursts. A further difficulty consists in that the receiving conditions are not correlated with regard to the two antennas, with the result that the selection of the switch-over instant is made more difficult.

Disclosed in the printed publication: Proceedings of Globecom. '90, Dec. 2–5, 1990, New York (US), pages 1013 to 1017; L. B. Lopes: "On the radio link performance of the digital European cordless telecommunications (DECT) system" is a structure of a simulated DECT receiver in the case of which an antenna diversity controlled by field strength measurement improves the coverage (range) and the capacity of DECT cordless telephones.

The printed publication: Patent Abstracts of Japan, Volume 011, No. 231, Jul. 28, 1987 in conjunction with JP-A-62047222 discloses an antenna diversity receiver in the case of which the antenna diversity effect is improved by changing a diversity switching threshold as a function of changes in the field strength of the received signal. The first step for this is to compare a first field strength value measured at a first antenna with a stored threshold value. If in the case of this comparison the measured field strength value is lower than stored threshold value, a second antenna is activated. If, however, the measured field strength value is higher than equal to the stored threshold value, the first antenna remains activated as before. In the case of the antenna switch-over, the previously stored threshold value is replaced at the same time by the measured field strength value. The result of this is that the threshold value is also continuously reduced in the case of a gradual lowering of the field strength value. The antenna diversity receiver continues to be constructed in such a way that whenever the measured field strength value exceeds the stored threshold value by a certain value, the threshold value stored up to that point is updated.

SUMMARY OF THE INVENTION

Starting from this prior art, it is the object of the invention to specify a method and an arrangement of the type mentioned at the beginning which method and which arrangement, respectively, on the basis of tailored driving of the antenna provides the best possible quality of reception for different receiving conditions and different faulty received signals of the relevant radio receiver, in particular the base station of a cordless telephone.

The object of the invention is achieved with the following method and apparatus. The method is for controlling antenna selection in a radio receiver, having a plurality of antennas having a device for measuring field strengths of received signals, and having a central processor, which forms at least one threshold value from the measured field strengths. Via the central processor realizing different selection procedures are realized as a function of measured field strength values of received signals and as a function of their overshooting or undershooting a first threshold value. Within each selection procedure a decision is made to activate one of the plurality of antennas of the radio receiver independently of the first threshold value.

The arrangement for controlling antenna selection has: means assigned to the central processor for realizing different selection procedures as a function of measured field strength values of received signals and as a function of their overshooting or undershooting of a first threshold value; and means for making, during each selection procedure a decision to activate one of the plurality of antennas of the radio receiver independently of the first threshold value.

The arrangement according to the invention analyses the receiving conditions and, as a function of specific criteria (measured field strength overshoots or undershoots a threshold value), realizes different selection procedures, the decision to activate one of a plurality of receiving antennas being performed within each procedure irrespective of the respective criterion. The tailored selection of one of a plurality of, in particular two, antennas means that the quality of reception is substantially improved. This is represented in FIG. 8, which reproduces the dependence of the bit error rate on the procedures realized according to the invention. FIG. 7 also illustrates the advantageous effect of the arrangement according to the invention.

The antenna switch-overs mentioned at the beginning can be performed after the selection of a procedure according to the invention. However, the invention also extends to further procedures. Essential here, inter alia, is the particular control of the threshold values on which the antenna switches are based. These threshold value control procedures guarantee in by far the overwhelming number of cases that the antenna is activated with the quality of reception which is respectively most favorable (compare FIG. 7), it being the case, however, that the outlay for updating the threshold value control procedures is kept relatively low.

The invention is distinguished, furthermore, by the advantage that areas having relatively unfavorable transmission conditions can be detected before the transmission conditions deteriorate to such an extent that transmission errors occur. In the case of field strength values which are rising or remaining constant, the antenna currently activated is not changed, although it is not to be excluded that the received signal quality is better on the currently non-activated antenna than on the currently activated antenna. However, by this measure the computer capacity of the arrangement is kept relatively low.

A further advantageous embodiment of the invention is characterized by forming a threshold value in relation to each measured field strength value, and by activating one or other antenna to receive the signals for the period following the measuring period as a function of the threshold value and as a function of the field strength value measured in the measuring period. This embodiment is distinguished by a plurality of advantages. Firstly, a substantial advantage consists in that the formation according to the invention of the threshold values from measured field strength values is performed independently of an average (over a plurality of periods) field strength. Such an average field strength has high values in the case of a small distance between a radio transmitter and a radio receiver, while the average field strength would have low values in the case of a large distance between the radio transmitter and radio receiver. According to the invention, the threshold values, and thus the two antennas of the radio receiver are formed independently of the distance between the radio receiver and radio transmitter. Furthermore, the formation of the threshold values, and thus the driving of the two antennas, is performed independently of component tolerances of the field strength measuring device (RSSI-C, FIG. 1) and of the temperature-dependent response of the components in the arrangement according to the invention. Finally, it is superfluous to calibrate or adjust the field strength measuring device, since the arrangement does not operate as a function of absolute field strength values, but relates measured field strength values to one another.

A further embodiment is distinguished by the advantage that when fixing the threshold value the time characteristic of the field strength over two consecutive periods is taken into account.

Advantageous embodiments of the invention are as follows.

An originally realized selection procedure continues to be realized in the case of originally overshooting or undershooting the first threshold value and in the case of a prescribable number of following instances of undershooting or overshooting the first threshold value.

The central processor of a base station corresponding to the "Digital European Cordless Telecommunications" standard, or of a mobile unit effects the step of checking, in the case of overshooting the first threshold value, the received signal for a transmission error in one of a plurality of check words. In the case of detection of such an error an antenna, not previously activated, of the radio receiver is activated for further reception of signals. Also, the central processor of a base station corresponding to the "Digital European Cordless Telecommunications" standard, or of a mobile unit effects the step of checking, in the case of overshooting the first threshold value, the received signal for reception of a burst. In the case of detection of non-reception of the burst an antenna, not previously activated, of the radio receiver is activated for further reception of signals.

The central processor of a base station corresponding to the "Digital European Cordless Telecommunications" standard, or of a mobile unit effects the step of comparing with one another in the case of overshooting the first threshold value, the field strength values measured during consecutive periods. If a measured field strength value lies below a prescribable difference below a field strength value measured immediately before, an antenna, not previously activated, of the radio receiver is activated for further reception of signals.

The central processor effects the step of activating, after undershooting the first threshold value, one of the plurality of antennas for reception of the signals as a function of field strengths, measured in consecutive periods a period following a measuring period. Via the central processor, if the field strength value measured in the measuring period is greater than or equal to the field strength value measured in a preceding period, the antenna activated in the measuring period remains activated for the period following the measuring period. Furthermore, a second threshold value is formed relative to each measured field strength value. One of the plurality of antennas is activated for reception of signals for the period following the measuring period, as a function of the second threshold value of a period preceding the measuring period and as a function of the field strength value measured in the measuring period. After an antenna switch-over the second threshold value formed for a first time is formed as the maximum of two values of which the first value is equal to the field strength value, which has been measured as a last measured value before the antenna switch-over, and of which the second value is equal to the first field strength value measured after the antenna switch-over minus a prescribable value.

In the arrangement the means assigned to the processor form a control program, or are hardware means.

The means assigned to the processor provide that an originally realized selection procedure continues to be realized in the case of originally overshooting or undershooting the first threshold value and in the case of a prescribable number of following instances of undershooting or overshooting the first threshold value.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
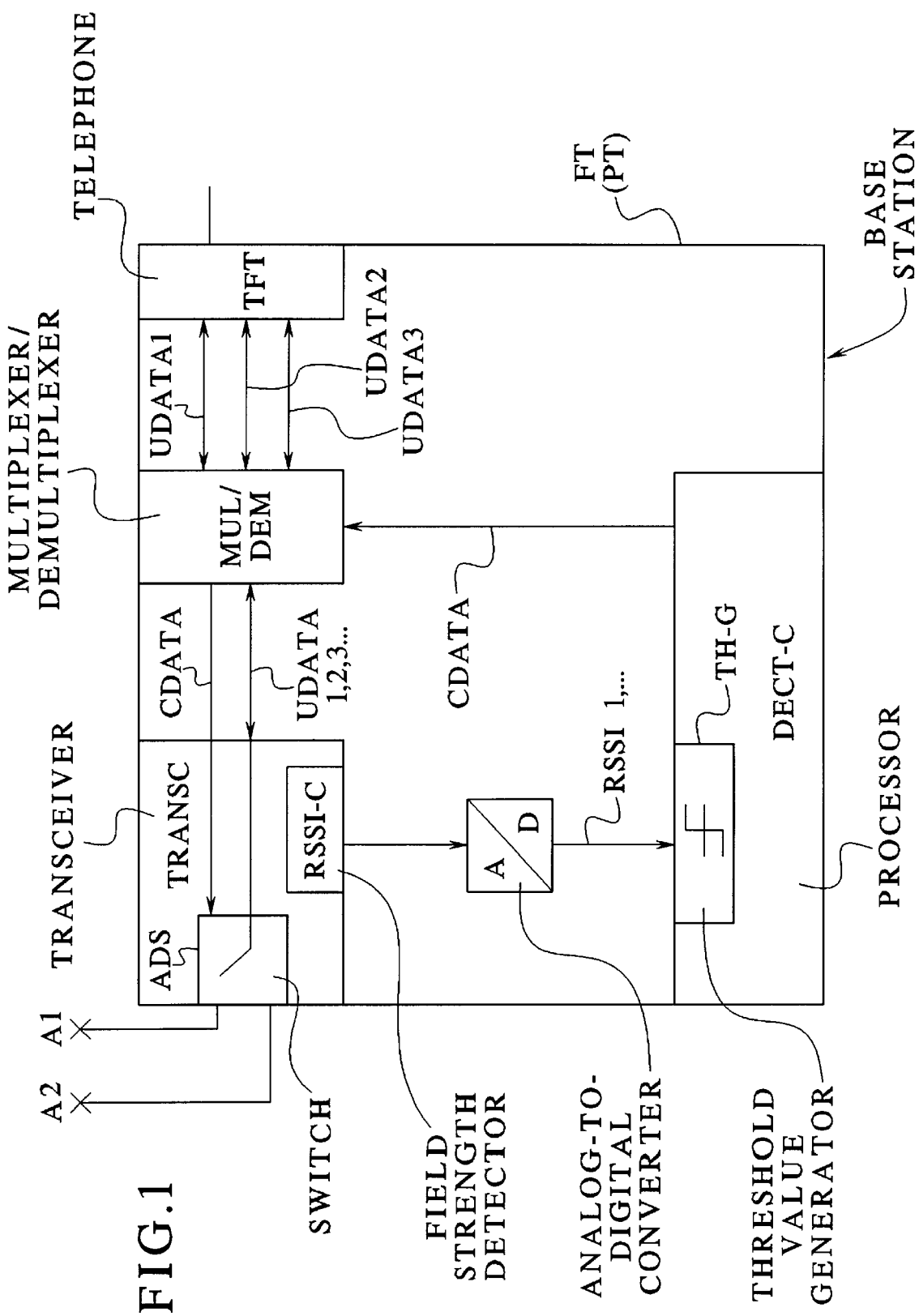
FIG. 1 shows a radio receiver having two antennas which are activated according to the method according to the invention.

The receiver represented in FIG. 1 is formed, for example, by the base station FT of a cordless telephone. In this case, it is assumed in the following description that the DECT standard is implemented for the cordless telephone. However, the invention is not restricted to this. The radio receiver according to the invention comprises a receiver part having two receiving antennas A1 and A2. The radio receiver has, interalia, a receiver part having two receiving antennas A1 and A2, In addition, it is possible to provide in the base station FT of the cordless telephone a radio transmitter which is connected to the radio receiver. The radio transmitter has, inter alia, a transmitter part which is likewise connected to the antennas A1 and A2. In this case, the antennas A1, A2 function as transmitting antennas. The transceiver device is designated in FIG. 1 as "TRANSC".

Firstly, there is integrated in the transceiver device part TRANSC a switching element ADS (Anenna Diversity Switch) which is controlled by control data CDATA, which—as still to be described—a processor DECT-C forms and feeds to the transceiver TRANSC, for example via a multiplex/demultiplex unit MUL/DEM.

Use may be made as a processor DEC-T of a programmable microprocessor or a hardware structure which, for example, has latches for intermediate storage of the field strength formed—and/or threshold values and comparators for comparing different values. DEC-T designates both configurations below.

Also integrated in this transceiver part TRANSC is a device RSSI-C which measures the field strength of received signals. This device RSSI-C serves in general to test whether a channel is seized (compare DECT-draft prETS, 175-3; 1991, page 164). The rule as to how the field strength is to be measured is specified in the DECT standard (compare DECT-draft prETS 300 175-2: 1991, page 31, 6.2 and page 38, 8.3). The channel seizure is determined by measuring the field strength (minimum field strength) of received signals. The unit RSSI-C undertakes a further function within the framework of the method according to the invention, specifically measuring the field strength of received signals, the measurement results being fed to the processor DECT-C via an analog-to-digital converter A/D and being used by the processor to form the control data CDATA and to control the threshold value generator TH-G integrated in the processor DECT-C. In continuous operation, the threshold value generator TH-G continuously forms updated values (TH in FIGS. 2 and 3), a different (higher or lower) or an equal value being formed with respect to a value present in each case. The formation of the threshold values is performed with the cooperation of the unit RSSI-C and the processor DECT-C as a function of the field strength values (RSSI in FIGS. 2 and 3) measured in consecutive periods.

The multiplex/demultiplex unit MUL/DEM generates or receives, for example, 1.152 Mbit/s data in the DECT burst format and assigns received data packets or data packets which are to be transmitted to up to, for example, six internal or three external telephone connections using the time division multiple excess (TDMA) method.

Integrated in the device MUL/DEM are coders/decoders ADPCM, downstream of which internal subscriber line circuits or exchange or private branch exchange circuits are connected. These devices connected downstream of the device MUL/DEM form a telephone section TFT which, for the rest, can be designed like the telephone line sections of known cordless telephone systems (Wolf, Klaus: "Auch ohne Schnur "auf Draht"" (""Live wire" even without a cord"), telcom report 10, 1987), Issue 2, pages 130 ff (134).

It is to be pointed out that the radio receiver described with the aid of FIG. 1 has only one (transmitter/) receiver TRANSC, and thus only one device RSSI-C for measuring the field strength values. The radio receiver described with the aid of FIG. 1 likewise has only one threshold value generator TH-G. It is therefore not possible simultaneously to measure the quality of the signals received at both antennas A1, A2.

If the radio receiver represented in FIG. 1 represents a mobile unit PT of a cordless telephone having a plurality of antennas, the function block TFT can be formed by the components which operate in the mobile unit independently of the method according to the invention (compare "Mikrophon, Akkumulatoren, Kennungskontakt, LED-Anzeige, Tastenfeld 4×5, Klappenschalter, Ruforgan, Horkapsel" ("Microphone, batteries, coded contact, LED display, key pad 4×5, flap switch, ringing element, earphone"), telcom report 10 (1987), Issue 2, page 135).

Figure 2:
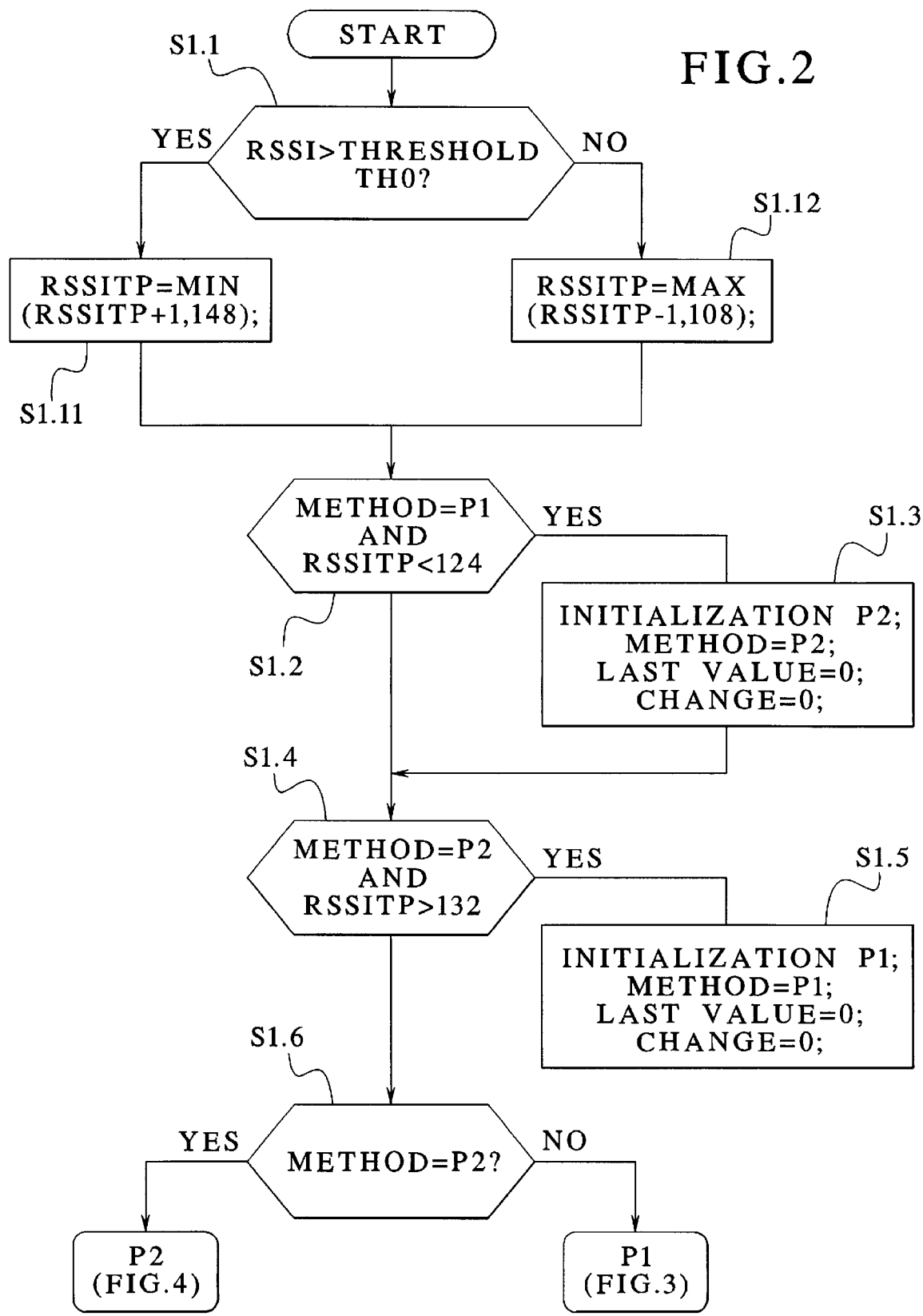
FIG. 2 shows a flow diagram of the method according to the invention and for activating one of a plurality of differing procedures by means of which one of a plurality of antennas of the radio receiver is selected.

The flow diagram represented in FIG. 2 explains how one of the two procedures P1 and P2, respectively, is selected (selection procedures P1, P2). Basically, the procedure is activated when a threshold TH0 is overshot, while the procedure P2 is activated when this threshold TH0 is undershot. However, in order to avoid a frequent change in procedure in the case of an original overshooting or undershooting of the threshold value TH0, and in the case of a prescribable number of subsequent undershootings or overshootings of this threshold value TH0, the procedure P1, P2 initially realized continues to be realized.

The prescribable number is realized by means of a counting element rssitp, which is interrogated for an upper and a lower counter reading (S1.11, S1.12 in FIG. 2). The counting element can take in a value range which is bounded above and below, in order to react in an appropriate time in the case of changing field strength conditions.

In FIG. 2,

RSSI signifies: the field strength value just measured;
threshold value TH0 signifies: the threshold which can already be prescribed during production or can be calibrated on commissioning;
rssitp signifies: a counting element which can, in particular, be realized by means of appropriate software procedures;
last value signifies: the field strength value last measured, if there has been no antenna switch-over before the sequence according to FIG. 2; and
change signifies: =0, if the antenna was not switched over before the sequence according to FIG. 2; in the case of an antenna switch-over, that field strength value which was measured as the last field strength value at the originally activated antenna, that is to say before the antenna switch-over.

The initialization values are as follows:
rssitp =128;
method =P1;
last value =0;
change =0;
threshold =(threshold value TH0) =80.

It is assumed in the following example that at the start of the method a first field strength value RSSI has the value 130 and is thus above the threshold of TH0=80. In the two following measuring periods, the field strength value is 75 in each case and therefore lies below the threshold TH0. Subsequent thereto, the field strength assumes the value 125, and thus lies again above the threshold value TH0. It is seen that in each case procedure P1 is selected, even in conjunction with the field strength values which lie below the threshold value TH0.

Figure 3:
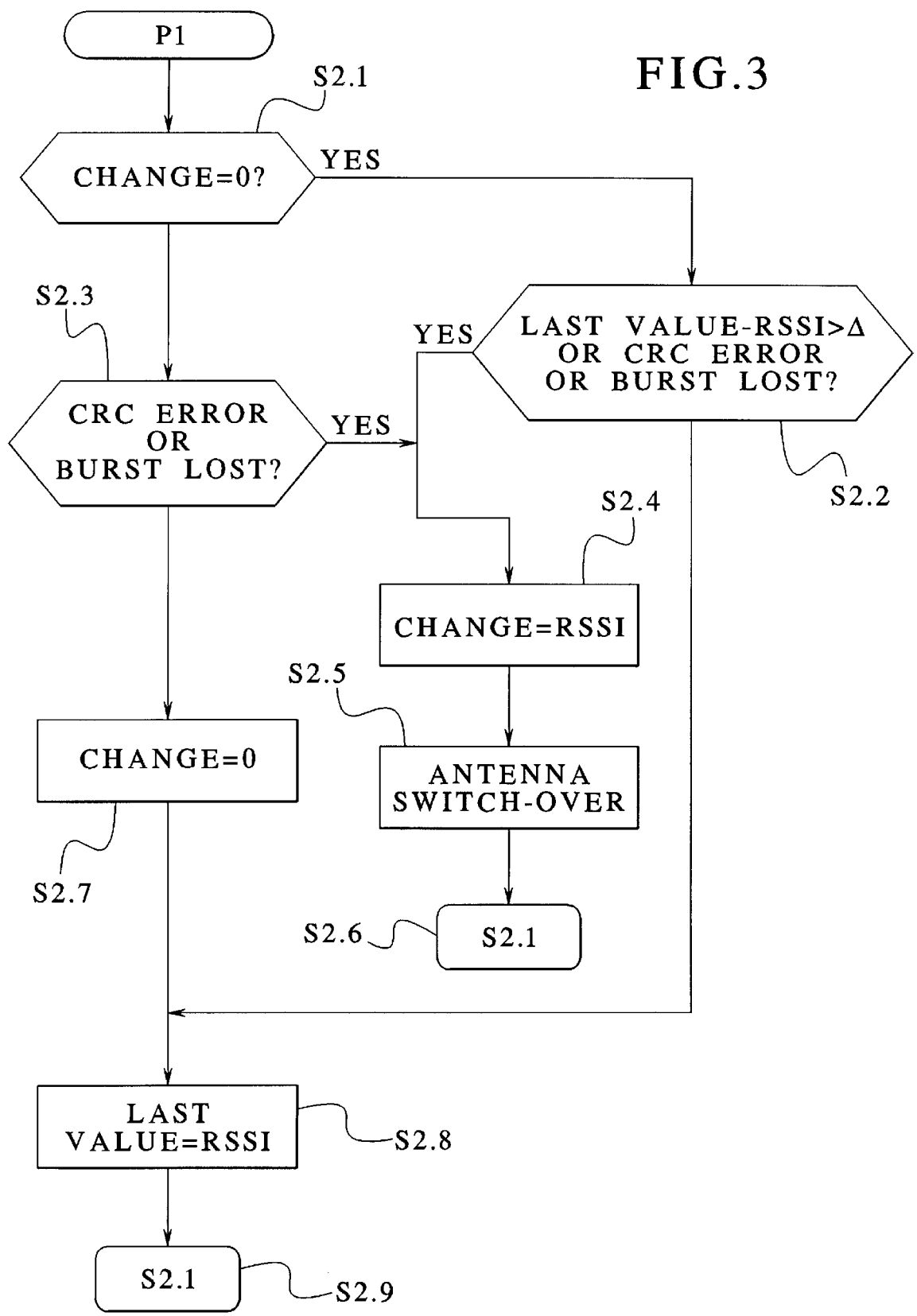
FIGS. 3 and 4 show flow diagrams of two different procedures.

The method steps of procedure P1 are represented in FIG. 3. "Change", "last value" and "HRSSI" have the meanings described in conjunction with FIG. 2.

As may be seen from FIG. 3, upon the occurrence of a CRC error or a burst loss, the respectively activated antenna is deactivated and the respective other antenna is activated. The antenna switch-over as a function of the said factors is already provided in the DECT standard. Furthermore, in the arrangement according to the invention, as it is represented in conjunction with step S2.2, an antenna switch-over is triggered when last value—RSSI is larger than a prescribable amount delta.

Figure 4:
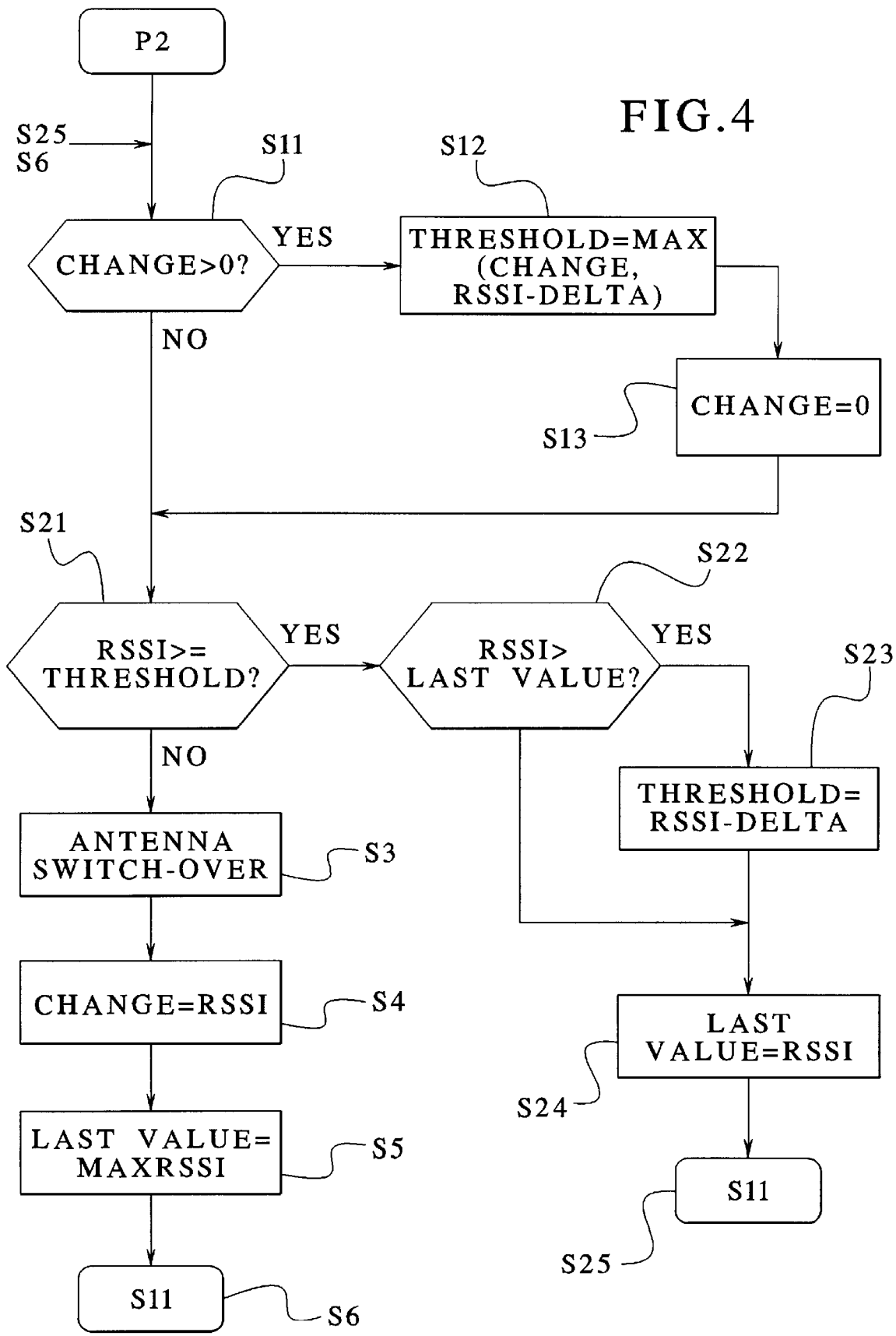

The method steps of procedure P2 are represented in FIG. 4; these can also be carried out when the threshold value TH0 is not provided. In a first method step S11, it is checked whether a value "change" is greater than 0. Two cases are distinguished in this connection; 1st. "change"=0 when the antenna was not switched over before step S11; 2nd. "change" is allocated, for the case of an antenna switch-over, the field strength value which was measured as last field strength value at the originally activated antenna, that is to say before the antenna switch-over.

During the initialization of the method, "change" has the value 0, with the result that step S21 follows.

However, if "change" has a value not equal to 0 (the antenna has been switched over before step S11), step S12 follows. The threshold value "threshold" formed by the threshold value generator TH-G is allocated the value (MAX (change RSSI-delta), "RSSI" designating the first field strength value measured at the new antenna. "Change" is allocated the value=0 in the next step S13. In the following step S21, it is checked whether the field strength value RSSI just measured is greater than or equal to the threshold value present. In the initialization of the system (steps S11, S21), the threshold value has the value 0; otherwise, the threshold value assumes the value allocated in step S12, or it has the value allocated in the preceding sequence in step S23.

If there is a positive result from the interrogation in step S21 (the current field strength value lies above the threshold value or is equal to the threshold value), it is checked in step S22 whether the current field strength value is greater than the field strength value previously measured and buffered ("last value"). In the case of a positive result of this check (the new field strength value is larger than the old field strength value), in step S23 the threshold value "threshold" is allocated a new value, which is equal to the current field strength value minus a value delta.

If, by contrast, the result of step S22 is that the current field strength value is less than or equal to the old field strength value, the current field strength value RSSI is allocated to "last value", in step S24. This also holds if the transition was to step S23 after step S22. Step S24 is followed by step S25, which leads back to step S11.

If step S21 produces a negative result (the current field strength value lies below the present threshold value), in step S3 the previously activated antenna is deactivated and another antenna is activated ("antenna switch-over").

The value "change" is allocated the current field strength value in step S4. The value "last value" obtains a maximum field strength value MAXRSSI in step S5. This allocation is necessary so that in the respectively following sequence the threshold value "threshold" is not changed twice (S12, S23).

Step S6 leads back to step S11.

The steps represented are realized, in particular, by means of a control program which is assigned to the central processor DECT-C (FIG. 1).

This control program or the corresponding hardware structure with latches, comparators and other components is configured in general in the following way (compare FIGS. 4 and 6):

Different procedures (P1, P2) are realized for activating one of a plurality of antennas (A1, A2) of the radio receiver as a function of measured field strength values (RSSI1) of received signals and as a function of overshooting or undershooting a threshold value (TH0).

In this connection, the originally realized procedure (P1, P2) continues to be realized (hysteresis) in the case of originally overshooting or undershooting threshold value (TH0) and in the case of a prescribable number of following instances of undershooting or overshooting the threshold value (TH0).

The central processor (DECT-C) of a base station (FT) corresponding to the "Digital European Cordless Telecommunications" (DECT) standard or of a mobile unit (PT) carries out method steps configured in such a way that in the case of overshooting the threshold value (TH0) the received signal is checked for an error in one of the check words (CRC, A-CRC, X-CRC), and that in the case of detection of such an error an antenna (A2), not previously activated, of the radio receiver is activated for further reception of signals.

In the case of overshooting the threshold value (TH0), the received signal is also checked for reception of the burst, and that in the case of detection of nonreception of the burst an antenna (A2), not previously activated, of the radio receiver is activated for further reception of signals.

Furthermore, in the case of overshooting the threshold value (TH0), the field strength values (RSSI1, RSSI2, RSSI3) measured during consecutive periods (T1, T2, T3) are compared with one another and if a measured field strength value (RSSI2) lies below a prescribable difference below a field strength value (RSSI1) measured immediately before, an antenna (A2), not previously activated, of the radio receiver is activated for further reception of signals.

The central processor (DECT-C) also carries out method steps configured in the following way such that after undershooting the threshold value (TH0) one of a plurality of antennas (A1, A2) is activated for reception of the signals as a function of field strengths (RSSI1, RSSI2), measured in consecutive periods (T1, T2), for the period (T3) following the measuring period (T2).

The central processor DECT can also carry out these method steps and also the method steps mentioned below independently of threshold value TH0. Thus, the central processor (DECT-C) also carries out method steps configured in such a way that if the field strength value (RSSI2) measured in the measuring period (T2) is greater than or equal to the field strength value (RSSI1) measured in the preceding period (T1), the antenna (A1) activated in the measuring period (T2) remains activated for the period (T3) following the measuring period (T2). A further threshold value (TH2, TH3) related individually to a field strength value is formed relative to each measured field strength value (RSSI1, RSSI2), and one of a plurality of antennas (A1, A2) is activated for reception of signals for the period (T3) following the measuring period (T2), as a function of the further threshold value (TH2) of the period (T1) preceding the measuring period (T2) and as a function of the field strength value (RSSI2) measured in the measuring period (T2).

In this connection, after an antenna switch-over (A1–A2) the first threshold value (TH21, TH27, TH28, TH39, TH40, TH41) is formed as the maximum of two values of which the first value is equal to the field strength value (RSSI20, RSSI26, RSSI27, RSSI38, RSSI39, RSSI40), which has been measured as the last measured value before the antenna switch-over, and of which the second value is equal to the first field strength value (RSSI21, RSSI27, RSSI28, RSSI39, RSSI40, RSSI41) measured after the antenna switch-over minus a prescribable amount (delta, FIG.4).

According to a further rule, when forming the first threshold value TH21 after an antenna switch-over, said value is formed as the arithmetic mean of two values of which the first value is a product of a factor a and the field strength value RSSI20 (last measured value before the antenna switch-over) and of which the second value is a product of a factor b and the field strength value RSSI21 (first field strength value measured after the antenna switch-over). The sum of the two factors a and b is, for example, equal to 2. For example, a=0.8 and b=1.2, with the result that the field strength value last measured is taken more strongly into account.

Figure 5:
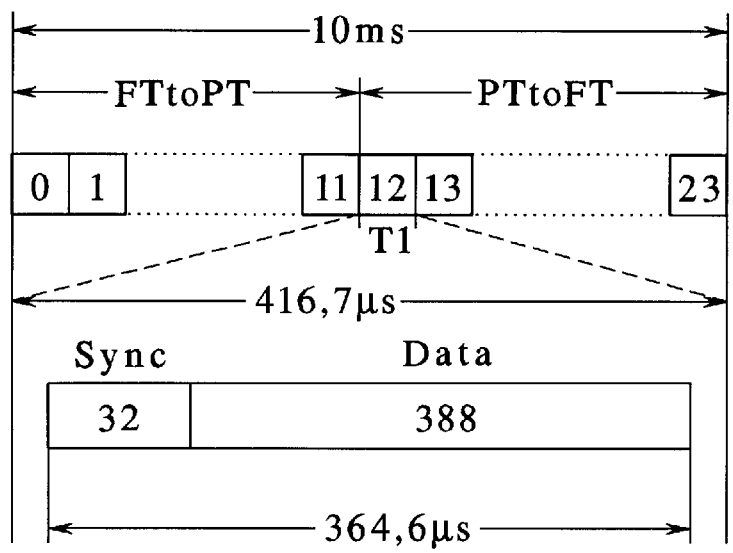
FIG. 5 shows a diagram which illustrates the assignment of the periods in which field strength values are measured and threshold values are formed.

FIG. 5 illustrates the relationship of the periods in which field strength values are measured and threshold values are formed. The diagram of FIG. 5 shows a TDMA frame according to the DECT standard. This frame has a frame length of approximately 10 ms and comprises 24 time slots 0 . . . 23, the first 12 time slots 0 . . . 11 serving connections from a base station to mobile parts ("FT to PT"="Fix to Portable"), and the second 12 time slots 12 . . . 23 serving connections from the mobile parts to the base station ("PT to FT" = "Portable to Fix").

Each time slot 0 . . . 23 is allocated a period of 416.7 $\mu$s. Of this, 364.6 $\mu$s serve to transmit 32 alignment bits (Sync) and 398 user data bits (Data). The remaining time of 416.7 $\mu$s – 364.6 $\mu$s is a so-called guard time, which serves the purpose, inter alia, of setting the transceiver device TRANSC to a further frequency, provided in the DECT standard, in the region of 1880–1900 MHz (frequency division multiplex and time division multiplex).

A duplex channel between the base station and a mobile unit comprises, for example, the time slot 0 (FT to PT) and the time slot 12 (PT to FT). The time slot 12 corresponds, for example, to the abovenamed period T1 in which the field strength value RSSI1 is measured. The following field strength value RSSI2 is measured in the following TDMA frame, again in time slot 12, which corresponds to the period T2 and starts 10 ms after the start of period T1.

The formation of a threshold value can generally be performed as a function not only of two field strength values but of a plurality of field strength values.

Figure 6:
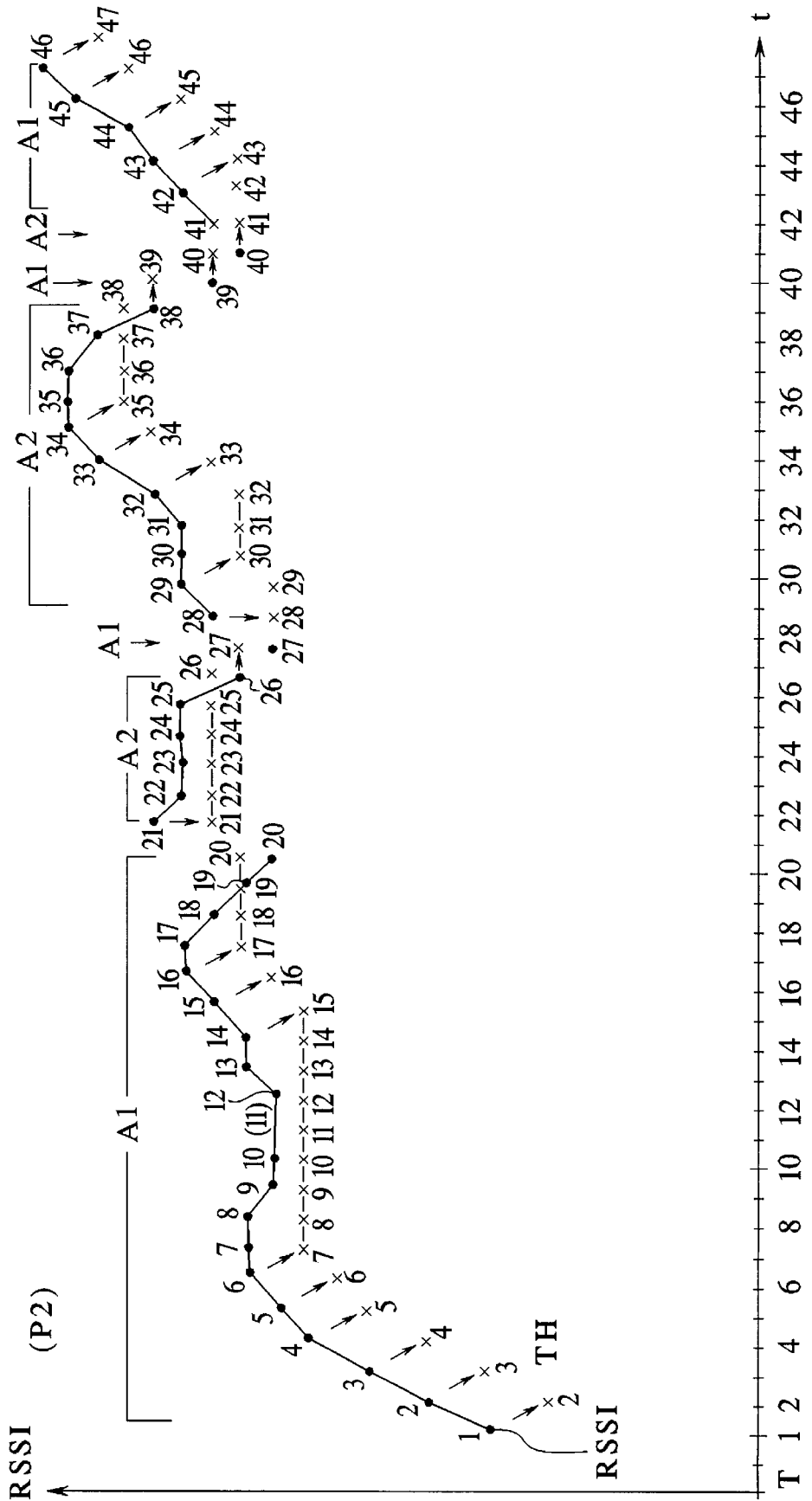
FIG. 6 shows the time characteristic of received signals with threshold values formed from field strength measuring points, and representations of antenna switch-overs within the framework of a procedure.

FIG. 6 shows the relationship between the field strength values RSSI measured at different instants, the threshold values TH formed as a function of these field strength values RSSI, and the corresponding activation of the receiving antennas A1, A2 of the system, in particular for the case of undershooting the threshold TH0 (procedure P2). This relationship is represented by arrows for selected field strength values and threshold values.

Periods T1 to T46 are given on the time axis t. The field strength of the respectively received signal is formed in these periods T1 . . . T46, for example respectively at the start of each period. The threshold value generator TH-G forms a threshold value for the respectively next period, particularly as a function of the field strength value just measured and that previously measured. The rules for the formation of threshold values are described above. These relationships are explained below in more detail with the aid of the concrete example represented in FIG. 4. The individual field strength values RSSI1 . . . RSSI46 for the individual periods are respectively given above the corresponding (measuring) points, while the associated threshold values TH2 . . . TH47 are represented by "x". The corresponding numbers are generally given below the "x".

It is assumed firstly that the antenna A1 is activated. Field strength values RSSI1 . . . RSSI6 respectively increasing one after the other are measured in the periods T1 to T5, inclusive. The threshold values TH2 . . . TH7 are corrected in an appropriate way, the threshold value THn+1 lying below the threshold value RSSIn by an amount delta in each case (FIG. 4, steps S12, S23).

A constant field strength RSSI7, RSSI8 is measured respectively in periods T6 and T7; the threshold values TH7 and TH8 are formed in a corresponding way. The antenna A1 continues to remain activated.

With decreasing field strength (T8–T9), the following threshold value TH10 (=TH9) remains constant, since RSSI9 does not drop below TH9. The original antenna A1 remains activated.

In the following (T10–T17), the field strength rises again or remains constant, the threshold value being updated, as already described, and the original antenna A1 remaining activated. It firstly also remains activated in period T18, since RSSI18 lies above TH18. TH18 is likewise taken over as TH19.

At the start of period T19, the measured field strength value RSSI19 is equal to the threshold value TH19. Following thereupon, the field strength RSSI20 drops below the corresponding threshold value TH20. Undershooting the field strength below the respective threshold value leads to the antenna switch-over from A1 to A2 at the start of period T21.

Thereafter, the field strength drops again or remains at a constant value until it drops below the threshold value at instant T25 (RSSI26<TH26). This leads to the antenna switch-over A2/A1.

The new threshold value TH27 is formed in accordance with Max(RSSI26, RSSI27-delta).

The field strength value RSSI28 then measured first lies above the threshold value TH28, which is formed in accordance with Max(RSSI27, RSSI28-delta). Following thereupon, the field strength values rise or remain constant up to instant T36. At the start of period T37, RSSI37 lies above TH37, with the result that the currently activated antenna A2 remains activated and the new threshold value TH38 remains unchanged with respect to the threshold value TH37. At the start of period T38, RSSI38 lies below TH38, with the result that the antenna is switched over (A2/A1). At the start of period T39, RSSI39 lies below the threshold value TH39, which is formed like the threshold value TH27, with the result that the antenna is switched over again (A1/A2). This also holds for the threshold value (TH40 and TH41 and the corresponding antenna switch-over.

It is to be stated in general that owing to the new fixing of the threshold value it is ensured after an antenna switch-over that the threshold value is overshot even in the case when there are relatively poor transmission conditions on both antennas A1, A2.

Figure 7:
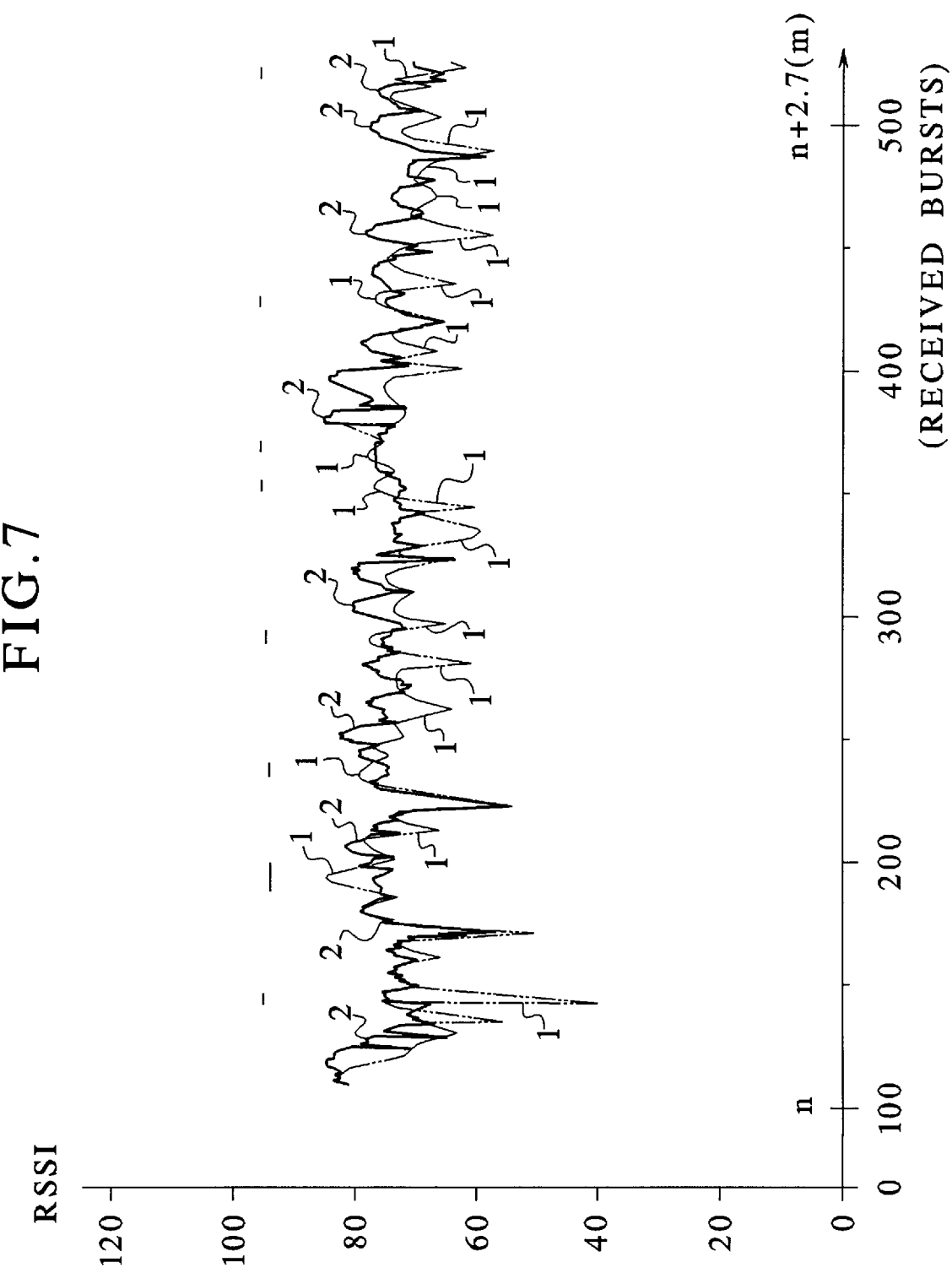
FIG. 7 shows the time characteristic of received signals with threshold values formed from field strength measuring points, and representations of antenna switch-overs.

FIG. 7 shows an exemplary RSSI characteristic on an arbitrary measuring distance from n to n +2.70 m, which the mobile unit covers in relation to the base station, the measuring distance starting at an arbitrary starting point and extending over 2.70 m in an arbitrary direction.

In this case, the RSSI measured values on the two antennas of a radio receiver according to the invention (DECT base station) are plotted in the background as a thin line and denoted by "1". These measured values are obtained by using a special measurement setup; in normal operation, only one antenna is activated in each case.

The measurement curve reproduced in bold type, which is denoted by "2", illustrates the result of the method according to the invention in the case of a speed of movement (fixed base station, moving mobile unit) of approximately 0.7 m/s (stepping speed).

FIG. 7 illustrates that the reception on the respectively more favorable antenna A1, A2 is virtually always guaranteed. The horizontal line in the upper region of the figure indicates times in which the antenna which leads to more unfavorable receiving conditions is switched on.

Figure 8:
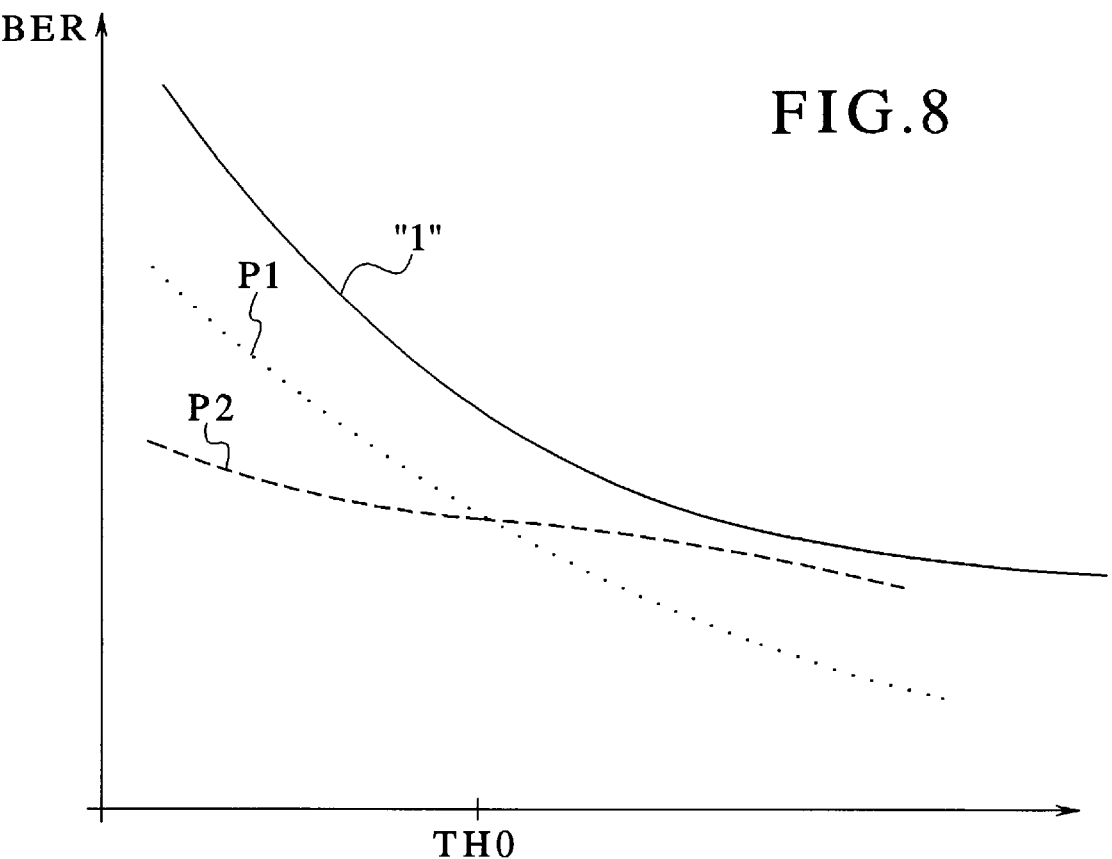
FIG. 8 shows the dependence of the bit error rate on the procedures according to the invention.

FIG. 8 shows the dependence of the bit error rate (BER) on received field strengths and on the procedures P1 (dotted line) and P2 (dashed line), as well as for the case in which in systems having only one antenna it is not possible to switch over to a further antenna (continuous line "1").

For field strength values below TH0, the procedure P2 effects a stronger reduction in the bit error rate than the procedure P1, while for field strength values above TH0 the procedure P1 reduces the bit error rate more strongly than the procedure P2.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method for antenna selection control in a radio transmission/reception means, in particular of a base station or of a mobile part of a cordless telephone, with a measuring means for measuring first field strength values of signals received via two antennas, with a threshold value generator for formation of first threshold values, and having a central processor, comprising the steps of:

comparing, via the control processor, a first field strength value, respectively measured at one of the two antennas, with a respectively formed first threshold value, and that respectively controls a no-change to the respective other antenna, if the respectively measured first field strength value is larger than the respectively formed first threshold value or is equal to the respectively formed first threshold value: and forming the first threshold value such that a) the first threshold value, respectively formed for a first field strength value/threshold value comparison, remains respectively unchanged for a subsequent second field strength value/threshold value comparison, if, in a first field strength value comparison between a respective currently measured first field strength value and a respective last-measured first field strength value, the respective currently measured first field strength value is respectively smaller than the respective last-measured first field strength value or is equal to the respective last-measured first field strength value, whereby, for a subsequent second field strength value comparison, the respective last-measured first field strength value is respectively replaced by the respective currently measured first field strength value;

b) for a subsequent second field strength value/threshold value comparison, the first threshold value, respectively formed for a first field strength value/threshold value comparison, is respectively replaced by a difference between a respective currently measured first field strength value and a correction value, if, in a first field strength value comparison between a respective currently measured first field strength value and a respective last-measured first field strength value, the respective currently measured first field strength value is respectively larger than the respective last-measured first field strength value, whereby, for a subsequent second field strength value comparison, the respective last-measured first field strength value is respectively replaced by the respective currently measured first field strength value.

2. Method according to claim 1, wherein a) second field strength values are measured using the measuring means, second threshold values are formed using the threshold value generator, and the central processor respectively controls a change to the respective other antenna, if the respectively measured second field strength value is smaller than the respectively formed second threshold value; and b) the second threshold value is respectively formed as a maximum value from a difference between a respective currently measured second field strength value and a correction value, as well as a respective second field strength value measured last before a change of antenna.

3. The method according to claim 2, wherein the respective last-measured second field strength value after a change of antenna is respectively replaced by a maximum field strength value.

4. A method for antenna selection control in a radio transmission/reception means, in particular of a base station or of a mobile part of a cordless telephone, with a measuring means for measuring first field strength values of signals received via two antennas, with a threshold value generator for formation of first threshold values and with a central processor, comprising the steps of:

controlling, via the central processor, a change from one antenna to the respective other antenna, if a respectively measured first field strength value is smaller than a respectively formed first threshold value; and forming the first threshold value as a maximum value from a difference between a respective currently measured first field strength value and a correction value, as well as a respective second field strength value measured last before a change of antenna.

5. An arrangement for antenna selection control in a radio transmission/reception means, in particular of a base station or of a mobile part of a cordless telephone, comprising:

a measuring means for measuring first field strength values of signals received via two antennas;

a threshold value generator for formation of first threshold values;

a central processor, for comparing the first field strength value, measured respectively at one of the two antennas with a respectively formed first threshold value, and for controlling a no-change to the respective other antenna, if the respectively measured first field strength value is larger than the respectively formed first threshold value or is equal to the respectively formed first threshold value;

means allocated to the central processor, which, for the formation of the respective first threshold value, are structured such that a) the first threshold value, respectively formed for a first field strength value/threshold value comparison, remains respectively unchanged for a subsequent second field strength value/threshold value comparison, if, in a first field strength value comparison between a respective currently measured first field strength value and a respective last-measured first field strength value, the respective currently measured first field strength value is respectively smaller than the respective last-measured first field strength value or is equal to the respective last-measured first field strength value, whereby, for a subsequent second field strength value comparison, the respective last-measured first field strength value is respectively replaced by the respective currently measured first field strength value;

b) for a subsequent second field strength value/threshold value comparison, the first threshold value, respectively formed for a first field strength value/threshold value comparison, is respectively replaced by a difference between a respectively currently measured first field strength value and a correction value, if, in a first field strength value comparison between a respective currently measured first field strength value and a respective last-measured first field strength value, the respective currently measured first field strength value is respectively larger than the respective last-measured first field strength value, whereby, for a subsequent second field strength value comparison, the respective last-measured first field strength value is respectively replaced by the respective currently measured first field strength value.

6. The arrangement according to claim 5, wherein the threshold generator is integrated in the central processor.

7. The arrangement according to claim 5, wherein the measuring means allocated to the processor are a control program.

8. The arrangement according to claim 5, wherein the measuring means allocated to the processor are hardware means.

9. An arrangement for antenna selection control in a radio transmission/reception means, in particular of a base station or of a mobile part of a cordless telephone, comprising:

a measuring means for measuring first field strength values of signals received via two antennas, with a threshold value generator for formation of first threshold values and with a central processor that respectively controls a change from one antenna to the respective other antenna, if the respectively measured first field strength value is smaller than the respectively formed first threshold value; and means allocated to the central processor that are structured such that the first threshold value is respectively formed as a maximum value from the difference between a respective currently measured first field strength value and a correction value, as well as a first field strength value measured last before a change of antenna.

10. The arrangement according to claim 9, wherein the threshold generator is integrated in the central processor.

11. The arrangement according to claim 9, wherein the measuring means allocated to the processor are a control program.

12. The arrangement according to claim 9, wherein the measuring means allocated to the processor are hardware means.

13. A method for controlling antenna selection in a radio receiver, having a plurality of antennas and, having a device for measuring field strengths of received signals, and having a central processor, which forms at least one threshold value from the measured field strengths, comprising the steps of: via the central processor realizing different selection procedures as a function of measured field strength values of received signals and as a function of their overshooting or undershooting a first threshold value; and via the central processor making within each selection procedure a decision to activate one of the plurality of antennas of the radio receiver independently of the first threshold value, that is, said decision to activate is determined separately from a selection of a procedure.

14. The method as claimed in claim 13, wherein an originally realized selection procedure continues to be realized in the case of originally overshooting or undershooting the first threshold value and in the case of a prescribable number of following instances of undershooting or overshooting the first threshold value.

15. The method according to claim 13, wherein the central processor of a base station corresponding to the "Digital European Cordless Telecommunications" standard, or of a mobile unit effects the step of checking, in the case of overshooting the first threshold value, the received signal for a transmission error in one of a plurality of check words, and wherein in the case of detection of such an error an antenna, not previously activated, of the radio receiver is activated for further reception of signals.

16. The method as claimed in claim 13, wherein the central processor of a base station corresponding to the "Digital European Cordless Telecommunications" standard, or of a mobile unit effects the step of checking, in the case of overshooting the first threshold value, the received signal for reception of a burst, and wherein in the case of detection of non-reception of the burst an antenna, not previously activated, of the radio receiver is activated for further reception of signals.

17. The method as claimed in claim 13, wherein the central processor of a base station corresponding to the "Digital European Cordless Telecommunications" standard, or of a mobile unit effects the step of comparing with one another in the case of overshooting the first threshold value, the field strength values, measured during consecutive periods, and wherein if a measured field strength value lies below a prescribable difference below a field strength value measured immediately before, an antenna, not previously activated, of the radio receiver is activated for further reception of signals.

18. The method according to claim 13, wherein the central processor effects the step of activating, after undershooting the first threshold value, one of the plurality of antennas for reception of the signals as a function of field strengths, measured in consecutive periods, for a period following a measuring period.

19. The method as claimed in claim 13, wherein via the central processor, if the field strength value measured in the measuring period is greater than or equal to the field strength value measured in a preceding period, the antenna activated in the measuring period remains activated for the period following the measuring period.

20. The method as claimed in claim 13, wherein a second threshold value is formed relative to each measured field strength value, and wherein one of the plurality of antennas is activated for reception of signals for the period following the measuring period, as a function of the second threshold value of a period preceding the measuring period and as a function of the field strength value measured in the measuring period.

21. The method as claimed in claim 18, wherein after an antenna switch-over the second threshold value formed for a first time is formed as the maximum of two values of which the first value is equal to the field strength value, which has been measured as a last measured value before the antenna switch-over, and of which the second value is equal to the first field strength value measured after the antenna switch-over minus a prescribable value.

22. An arrangement for controlling antenna selection in a radio receiver having a plurality of antennas and, having a device for measuring field strengths of received signals, and having a central processor, which forms at least one threshold value from the measured field strengths, comprising: means assigned to the central processor for realizing different selection procedures as a function of measured field strength values of received signals and as a function of their overshooting or undershooting of a first threshold value; and means for making, during each selection procedure a decision to activate one of the plurality of antennas of the radio receiver independently of the first threshold value, that is, said decision to activate is determined separately form a selection of a procedure.

23. The arrangement as claimed in claim 22, wherein the means assigned to the processor form a program.

24. The arrangement as claimed in claim 22, wherein the means assigned to the processor are hardware means.

25. The arrangement as claimed in claim 22, wherein the means assigned to the processor provide that an originally realized selection procedure continues to be realized in the case of originally overshooting or undershooting the first threshold value and in the case of a prescribable number of following instances of undershooting or overshooting the first threshold value.

26. The arrangement according to claim 22, wherein the central processor of a base station corresponding to the "Digital European Cordless Telecommunications" standard, or of a mobile unit provides that in the case of overshooting the first threshold value, the received signal is checked for a transmission error in one of a plurality of check words, and wherein in the case of detection of such an error an antenna, not previously activated, of the radio receiver is activated for further reception of signals.

27. The arrangement as claimed in claim 22, wherein the central processor of a base station corresponding to the "Digital European Cordless Telecommunications" standard, or of a mobile unit provides that in the case of overshooting the first threshold value, the received signal is checked for the reception of a burst, and wherein in the case of detection of non-reception of the burst an antenna, not previously activated, of the radio receiver is activated for further reception of signals.

28. The arrangement as claimed in claim 1, wherein the central processor of a base station corresponding to the "Digital European Cordless Telecommunications" standard, or of a mobile unit provides that in the case of overshooting the first threshold value the field strength values measured during consecutive periods are compared with one another, and wherein if a measured field strength value lies below a prescribable difference below a field strength value measured immediately before, an antenna, not previously activated, of the radio receiver is activated for further reception of signals.

29. The method according to claim 22, wherein the central processor provides that after undershooting the first threshold value one of the plurality of antennas is activated for reception of the signals as a function of field strengths, measured in consecutive periods, for a period following a measuring period.

30. The arrangement as claimed in claim 29, wherein the central processor provides that if the field strength value measured in the measuring period is greater than or equal to the field strength value measured in a preceding period, the antenna activated in the measuring period remains activated for the period following the measuring period.

31. The arrangement as claimed in claim 29, wherein a second threshold value is formed relative to each measured field strength value, and wherein one of the plurality of antennas is activated for reception of signals for the period following the measuring period, as a function of the second threshold value of a period preceding the measuring period and as a function of the field strength value measured in the measuring period.

32. The arrangement as claimed in claim 30, wherein after an antenna switch-over the second threshold value formed for a first time is formed as the maximum of two values of which the first value is equal to the field strength value, which has been measured as a last measured value before the antenna switch-over, and of which the second value is equal to the first field strength value measured after the antenna switch-over minus a prescribable value.

* * * * *